US012451096B2

(12) United States Patent
Jiang et al.

(10) Patent No.: US 12,451,096 B2
(45) Date of Patent: Oct. 21, 2025

(54) LIQUID CRYSTAL DISPLAY (LCD) DEVICE PERFORMING DYNAMIC COMPENSATION FOR DIFFERENT RESISTANCE OF FAN-OUT TRACES

(71) Applicant: HKC CORPORATION LIMITED, Shenzhen (CN)

(72) Inventors: Yongjie Jiang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/236,927

(22) Filed: Aug. 22, 2023

(65) Prior Publication Data

US 2024/0331654 A1 Oct. 3, 2024

(30) Foreign Application Priority Data

Mar. 28, 2023 (CN) ........................ 202310315666.5

(51) Int. Cl.
*G09G 3/36* (2006.01)

(52) U.S. Cl.
CPC ... *G09G 3/3688* (2013.01); *G09G 2300/0819* (2013.01); *G09G 2310/08* (2013.01); *G09G 2320/0233* (2013.01)

(58) Field of Classification Search
CPC ...... G09G 3/36; G09G 3/3611; G09G 3/3614; G09G 3/3622; G09G 3/3625; G09G 3/364; G09G 3/3644; G09G 3/3648; G09G 3/3655; G09G 3/3659; G09G 3/3666; G09G 3/3674; G09G 2300/0819; G09G 2300/0828
(Continued)

(56) References Cited

U.S. PATENT DOCUMENTS 12,111,546 B2 * 10/2024 Wu .................. G02F 1/136286
2002/0003521 A1 * 1/2002 Matsueda ............ G09G 3/3688 345/89
(Continued)

FOREIGN PATENT DOCUMENTS

CN 1746966 A 3/2006
CN 208737865 U 4/2019
(Continued)

*Primary Examiner* — Ke Xiao
*Assistant Examiner* — Nelson Lam

(57) ABSTRACT

A driving circuit of a display panel and a driving method thereof are disclosed. The display panel includes multiple data lines and fan-out traces connected to the multiple fan-out traces in one-to-one correspondence. The driving circuit includes multiple compensation circuits and a signal input unit. Each compensation circuit includes an input terminal and an output terminal. The output terminals of the multiple compensation circuits are respectively connected to the plurality of fan-out traces. At least two gear positions are set in each compensation circuit. When the gear position of the compensation circuit increases, a capacitance value or a resistance value of the compensation circuit gradually decreases. The signal input unit outputs data signals to the input terminals of the multiple compensation circuits. Each compensation circuit selects a gear position depending on a gray scale of a data signal or a scanning time during progressive scanning of the display panel.

13 Claims, 3 Drawing Sheets

(58) Field of Classification Search
USPC .................................................... 345/87–104
See application file for complete search history.

(56) References Cited

U.S. PATENT DOCUMENTS

| | | | | |
|---|---|---|---|---|
| 2003/0085859 | A1* | 5/2003 | Lee | G09G 3/3688 345/87 |
| 2006/0066538 | A1* | 3/2006 | Kasai | G09G 3/325 345/77 |
| 2007/0182693 | A1* | 8/2007 | Kwon | G09G 3/2011 345/100 |
| 2008/0259016 | A1* | 10/2008 | Tanaka | G09G 3/3688 345/90 |
| 2015/0015553 | A1* | 1/2015 | Cho | G09G 3/3611 345/94 |
| 2015/0187294 | A1* | 7/2015 | Chen | G09G 3/3685 345/98 |
| 2016/0018711 | A1* | 1/2016 | Chen | G09G 3/3611 345/87 |
| 2018/0151133 | A1* | 5/2018 | Huang | G09G 3/2092 |
| 2021/0035482 | A1 | 2/2021 | Xiong | |
| 2021/0051780 | A1* | 2/2021 | Sun | G02F 1/136286 |

FOREIGN PATENT DOCUMENTS

| | | | |
|---|---|---|---|
| CN | 111091778 | A | 5/2020 |
| CN | 112669755 | A | 4/2021 |

* cited by examiner

LIQUID CRYSTAL DISPLAY (LCD) DEVICE PERFORMING DYNAMIC COMPENSATION FOR DIFFERENT RESISTANCE OF FAN-OUT TRACES

CROSS-REFERENCE TO RELATED APPLICATIONS

This application claims the priority and benefit of Chinese patent application number 2023103156665, titled "Driving Circuit of Display Panel and Driving Method Thereof" and filed Mar. 28, 2023 with China National Intellectual Property Administration, the entire contents of which are incorporated herein by reference.

TECHNICAL FIELD

The present application relates to the field of display technology, and more particularly relates to a driving circuit of a display panel and a driving method thereof.

BACKGROUND

The description provided in this section is intended for the mere purpose of providing background information related to the present application but doesn't necessarily constitute prior art.

A liquid crystal display (LCD) device includes an LCD panel for displaying images and a panel driving circuit for driving the LCD panel. An LCD panel generally includes an array substrate, on which are disposed switching elements, scan lines for transmitting gate voltage signals to the switching elements, and data lines for transmitting data voltage signals to the switching elements.

Due to the wiring of the data lines, multiple fan-out traces of different lengths are disposed between the data lines and the bonding portion. Each fan-out trace bonds and connects a corresponding output terminal of a driver chip to a corresponding data line in a fan-out manner. As the resolution of the display panel increases, the number of data lines increases, and the number of fan-out traces also increases, resulting in greater differences in resistance and capacitance. It is proposed in the related art to make the fan-out traces at each and every position equal in length or impedance by winding the fan-out traces. However, for a narrow-bezel display panel currently demanded, the above method may affect the realization of the narrow-bezel, and restrict the screen ratio. Alternatively, it is possible to add the PPCC (Programmable Panel Charging Compensation) function in the driver chip to solve the fan-out mura problem by compensating the data signals output by the driver chip. However, the compensation capability based on the PPCC function is limited, and the cost of the driver chip with the PPCC function is very high. Therefore, those skilled in the art urgently need a new solution to solve the problem of unbalanced impedances of fan-out traces.

SUMMARY

In view of the above, it is accordingly a purpose of the present application to provide a driving circuit of a display panel and a driving method thereof, which can perform dynamic compensations for different resistance values of fan-out traces, and the cost is relatively low.

The present application discloses a driving circuit for a display panel. The display panel includes a plurality of data lines and a plurality of fan-out traces. The plurality of data lines are connected to the plurality of fan-out traces in one-to-one correspondence. The driving circuit includes a plurality of compensation circuits and a signal input unit. Each compensation circuit includes a plurality of input terminals and an output terminal. The plurality of output terminals are respectively connected to the plurality of fan-out traces. At least two compensation levels are set in the compensation circuit. When the compensation level of the compensation circuit increases, the capacitance value or resistance value of the compensation circuit decreases gradually. The signal input unit outputs data signals to the input terminals of a plurality of the compensation circuits. The compensation circuit selects a compensation level according to the gray scale of the data signal or the scanning time when the display panel scans progressively.

In some embodiments, on a same data line, when the grayscale of the data signal gradually decreases, the compensation level of the compensation circuit gradually increases. Alternatively, within the scanning time of one frame of the display panel, in the progressive scanning direction along the scanning lines, the compensation levels of the compensation circuits on the same data line gradually increase.

In some embodiments, the number of the compensation circuits is less than or equal to the number of the fan-out traces. When the number of the compensation circuits is smaller than the number of the fan-out traces, at least two adjacent fan-out traces share one compensation circuit.

In some embodiments, the compensation circuit includes a compensation level selection circuit and a gating circuit. The gating circuit includes multiple channels. The resistance values or capacitance values of multiple channels increase sequentially. The control terminal of each channel is connected to the compensation level selection circuit. The compensation level selection circuit controls the conducting of multiple channels, and only one of the channels is conducting at the same time.

In some embodiments, the compensation level selection circuit includes a control input terminal and a number of n control output terminals. The gating circuit includes a number of n channels, where n is a positive integer greater than or equal to 2. A first channel includes a first active switch, a first resistor and a first capacitor. An n-th channel includes an n-th active switch, an n-th resistor and an n-th capacitor. One end of each of the n channels is connected to the respective input terminal of the compensation circuit, and the other end of each of the n channels is connected to the respective output terminal of the compensation circuit. The first active switch is connected in series with the first resistor. One end of the first capacitor is connected to one end of the first resistor, and the other end of the first capacitor is grounded. The n-th active switch is connected in series with the n-th resistor. One end of the n-th capacitor is connected to one end of the n-th resistor, and the other end of the n-th capacitor is grounded. The n control output terminals are respectively connected to the control terminals of the first active switch, . . . , the n-th active switch.

In some embodiments, the compensation level selection circuit includes a control input terminal and n control output terminals.

The gating circuit includes a number of n channels, n is a positive integer greater than or equal to 3. The first channel includes a first active switch, a first resistor and a first capacitor. The second channel includes a second active switch, a second resistor and a second capacitor. The n-th channel includes an n-th active switch, an n-th resistor and an n-th capacitor. The n control output terminals are respectively connected to the control terminals of the first active switch, . . . , the n-th active switch. The first active switch is connected in series with the first resistor. One end of the first capacitor is connected to one end of the first resistor, and the other end of the first capacitor is grounded. One end of the first resistor is connected to the output terminal of the compensation circuit. The input terminal of the first active switch is connected to the input terminal of the compensation circuit. The second active switch is connected in series with the second resistor. One end of the second capacitor is connected to one end of the second resistor, and the other end of the second capacitor is grounded. One end of the second resistor is also connected between the first resistor and the first active switch. The input terminal of the second active switch is connected to the input terminal of the compensation circuit. The n-th active switch is connected in series with the n-th resistor. One end of the n-th capacitor is connected to one end of the n-th resistor, and the other end of the n-th capacitor is grounded. One end of the n-th resistor is also connected between the (n−1)th resistor and the (n−1)th active switch. The input terminal of the n-th active switch is connected to the input terminal of the compensation circuit.

In some embodiments, the resistance values of the first resistor, the second resistor, . . . , the n-th resistor are equal. The capacitance values of the first capacitor, the second capacitor, . . . , the n-th capacitor are equal.

In some embodiments, the driving circuit further includes a feedback circuit. The feedback circuit includes a comparator and at least two feedback signal lines. At least one of the feedback signal lines is connected to the shortest fan-out trace, and at least one of the feedback signal lines is connected to the longest fan-out trace.

The comparator receives the feedback signal on each of the feedback signal lines and the data signal of the fan-out trace connected to the feedback signal, and outputs a comparison result after comparison. The compensation circuit selects the compensation level of the compensation circuit according to the comparison result.

The present application further discloses a driving method of a driving circuit, the driving circuit is as the above-mentioned driving circuit of the display panel, and the driving method includes:

- receiving a data signal;
- selecting a compensation level of the compensation circuit according to a grayscale of the data signal or a scanning time during the progressive scanning of the display panel;
- compensating the data signal according to the compensation level of the compensation circuit, and outputting it to the corresponding data line.

In some embodiments, before receiving the data signal, the method further includes:

- after receiving the initial data signal, outputting it to the corresponding data line;
- receiving feedback signals on at least two feedback signal lines, and outputting a comparison result after comparing them against the data signals on the data lines connected to the feedback signals;
- setting the initial compensation levels of multiple compensation circuits according to the comparison result;
- where the step of selecting the compensation level of the compensation circuit according to the gray scale of the data signal or the scanning time during the progressive scanning of the display panel includes:
  - according to the gray scale of the data signal or the scanning time during the progressive scanning of the display panel, choosing to raise or lower the initial compensation level.

The compensation circuit in this application has different compensation level selections, and its resistance and capacitance are different in different compensation levels. In different gray scales or scanning times, different compensation levels may be selected to match the fan-out traces. First, in different panel designs, the design of the fan-out traces is also different. The compensation circuit of the present application can have various resistance values or capacitance values to balance the impedance differences of the fan-out traces. Therefore, in the face of different designs of the fan-out traces, the present application can balance the impedance differences of the fan-out traces only by modifying different compensation levels. Second, due to the wiring design of the data lines, on the same data line, the pixel charging path close to the data driver is relatively short and has relatively low impedance, while the pixel charging path far away from the data driver is relatively long and has relatively high impedance. Therefore, the present application gradually increases or decreases the compensation level to realize that the pixel far away from the data driver and with a high charging impedance is configured with a compensation circuit with a lower resistance value or capacitance value, so as to balance the charging differences caused by the charging paths on the same data line. Third, since the voltage values of the data signals corresponding to different gray scales are different, on the same data line, the display unevenness caused by different voltage values is not linearly correlated. Therefore, for the same data line, different gray scales require different resistance values of the compensation circuit. For this application, by adjusting compensation levels, the compensations under different gray scales can also be realized, thereby making the display under different gray scales more uniform. The solution of setting the compensation circuit in this application is relatively lower in cost, and for different pixels and different gray scales of the same data line and for the multiple data lines, the uneven impedance can all be compensated, so that the display effect of the display panel is better.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

Figure 1:
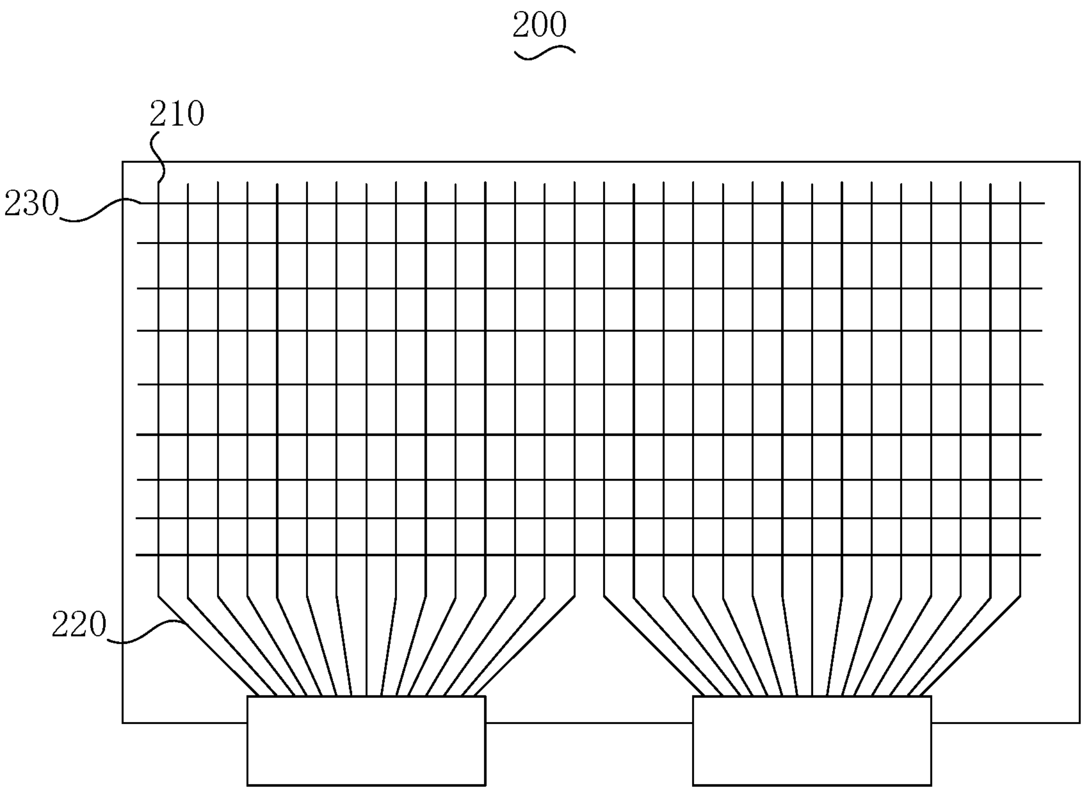
FIG. 1 is a schematic diagram of fan-out traces and data lines of a display panel according to the present application.

In the drawings: 100, driving circuit; 110, compensation circuit; 111, input terminal; 112, output terminal; 120, compensation level selection circuit; 121, control input terminal; K1/K2/Kn, control output terminal; 130, gating circuit; 131, channel; A1, first channel; A2, second channel; An, n-th channel; 140, feedback signal line; 200, display panel; 210, data line; 220, fan-out trace; 230, scanning line; T1, first active switch; T2, second active switch; Tn, n-th active switch; R1, first resistor; R2, second resistor; Rn, n-th resistor; C1, first capacitor; C2, second capacitor; Cn, n-th capacitor.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms “first”, “second”, or the like are merely used for illustrative purposes, and shall not be construed as indicating relative importance or implicitly indicating the number of technical features specified. Thus, unless otherwise specified, the features defined by “first” and “second” may explicitly or implicitly include one or more of such features. Terms “multiple”, “a plurality of”, and the like mean two or more. In addition, terms “up”, “down”, “left”, “right”, “vertical”, and “horizontal”, or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure. For those of ordinary skill in the art, the specific meanings of the above terms as used in the present application may be understood depending on specific contexts.

Hereinafter this application will be described in further detail with reference to the accompanying drawings and some optional embodiments.

FIG. 1 is a schematic diagram of fan-out traces and data lines of a display panel of the present application. Referring to FIG. 1, the display panel 200 includes scan lines 230 and data lines 210 located in the display region. The scan lines 230 extend in a different direction from the data lines 210. A plurality of fan-out traces 220 are arranged in a non-display region. The extension direction of the fan-out traces 220 is consistent with that of the data lines 210. The multiple data lines 210 are connected to the multiple fan-out traces 220 in a one-to-one correspondence. In general, fan-out traces 220 need to be provided for both the scan lines 230 and the data lines 210 to connect the scan lines 230 and the data lines 210 to an external driver chip. Only for the GOA display panel 200, the scan lines 230 do not need the fan-out traces 220. It may be understood that the solution of the present application in which the fan-out traces 220 are connected to the data lines 210 is also applicable to the fan-out traces 220 connected to the scan lines 230.

Figure 2:
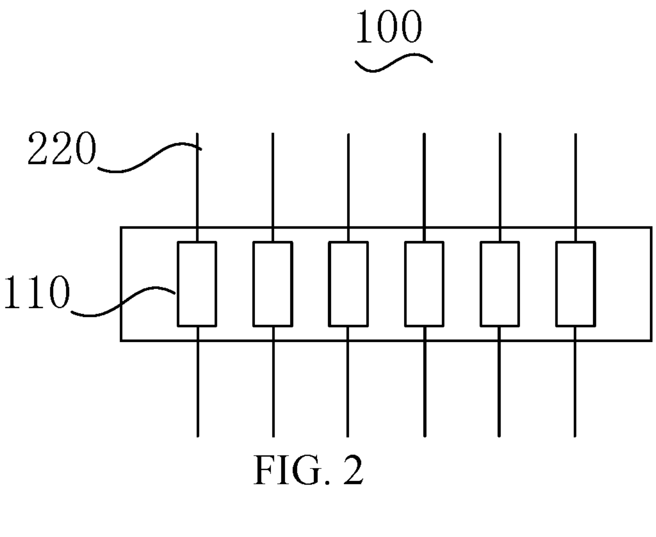
FIG. 2 is a schematic diagram of a driving circuit of a display panel according to the present application.

FIG. 2 is a schematic diagram of a driving circuit 100 of a display panel 200 of the present application. Referring to FIG. 2, the driving circuit 100 includes a plurality of compensation circuits 110 and a signal input unit (not shown). Each compensation circuit 110 includes input terminals 111 and an output terminal 112. The plurality of output terminals 112 are respectively connected to the plurality of fan-out traces 220. Each compensation circuit 110 is provided with at least two compensation levels. When the compensation level of the compensation circuit 110 increases, the capacitance or resistance value of the compensation circuit 110 decreases gradually. The signal input unit outputs data signals to the input terminals of the plurality of compensation circuits 110. The compensation circuit 110 selects a compensation level depending on the gray scale of the data signal or the scanning time when the display panel 200 scans progressively.

The signal input unit may be a timing controller. The system-on-chip SOC or motherboard chip receives external image signals, and sends the image signals to the timing controller TCON. The timing controller outputs the scanning signals and the data signals in the image signals to the scanning driver and the data driver respectively. The driving circuit 100 of the present application is mainly improved in the data driver.

The compensation circuit 110 in this application has different compensation level selections, and its resistance and capacitance are different at different compensation levels. In different gray scales or scanning times, different s may be selected to match the fan-out traces 220. First, in different panel designs, the design of the fan-out traces 220 is also different. The compensation circuit 110 of the present application can have various resistance values or capacitance values to balance the impedance differences of the fan-out traces 220. Therefore, in the face of different designs of the fan-out traces 220, the present application can balance the impedance differences of the fan-out traces 220 only by modifying different compensation levels. Second, due to the wiring design of the data lines 210, on the same data line 210, the pixel charging path relatively close to the data driver is relatively short and has relatively low impedance, while the pixel charging path far away from the data driver is relatively long and has relatively high impedance. Therefore, the present application gradually increases or decreases the compensation level to realize that the pixel far away from the data driver and with a high charging impedance is configured with a compensation circuit 110 with a lower resistance value or capacitance value, so as to balance the charging differences caused by the charging paths on the same data line 210. Third, since the voltage values of the data signals corresponding to different gray scales are different, on the same data line 210, the display unevenness caused by different voltage values is not linearly correlated. Therefore, for the same data line 210, different gray scales require different resistance values of the compensation circuit 110. For this application, by adjusting compensation levels, the compensations under different gray scales can also be realized, thereby making the display under different gray scales more uniform. The solution of setting the compensation circuit 110 in this application is relatively lower in cost, and for different pixels and different gray scales of the same data line 210 and for the multiple data lines 210, the uneven impedance can all be compensated, so that the display effect of the display panel 200 is better.

As for the grayscale, on the same data line 210, when the grayscale of the data signal gradually decreases, the compensation level of the compensation circuit 110 gradually increases. For the same data line 210, as the gray scale increases, that is, in the process from 0 to 255, the uneven brightness and the gray scale do not have a completely linear relationship. For example, for sections in the 0-31 gray scale, 31-63 gray scale, 63-127 gray scale and 127-191 gray scale, there is a linear correlation within each section, while the linear coefficient varies from section to section. Therefore, for different linear relationships, it is needed to use different compensation levels of the compensation circuit 110 for compensation, so that there will be no display unevenness. It may be understood that when the gray scale of the data signal is different, the degree of coupling to the common line and the adjacent data line 210 is also different, which also causes uneven brightness in contrast with adjacent pixels, which can also be solved by the present application.

During the scanning time of one frame of the display panel 200, along the progressive scanning direction of the scanning lines 230, the compensation level of the compensation circuit 110 on the same data line 210 gradually increases. In this embodiment, it is related to the length of the data line 210. On the same data line 210, the closer to the data driver, the shorter the line length and the smaller the load. The farther away from the data drive, the longer the line length and the greater the load. Therefore, for the same data line 210, the load of the pixels increases gradually from the data driver to the extending direction of the data line 210. For this embodiment, when the scanning lines 230 are progressively scanned from the data driver to the extension direction of the data line 210, the compensation level of the compensation circuit 110 may be gradually increased during the progressive scanning, so that the resistance value or capacitance value of the compensation circuit 110 gradually decreases, and so for different pixels on the same data line 210, the loads are approximately kept consistent, which reduces the occurrence of uneven impedance on the same data line 210 leading to inconsistencies in brightness.

It may be understood that the compensation circuits 110 corresponding to different data lines 210 may be different. For example, the compensation circuit 110 configured with the data line 210 connected to a shorter fan-out trace 220 may have more compensation levels to choose from, and the resistance value and capacitance value may be larger. More compensation levels are selected because the compensation circuit 110 generally increases the total load of the data lines 210, thereby making the loads among different data lines 210 more balanced, but for a single data line 210, it undoubtedly increases the load and causes more power loss. Therefore, in the case that the impedances of the multiple data lines 210 are approximately balanced, in this embodiment, the impedance on a single data line 210 may be reduced by increasing the compensation level, and then the extreme situation in which the display unevenness does not occur while the impedances of the plurality of data lines 210 are approximately balanced but not completely equal may be selected.

Therefore, for this application, for multiple data lines 210, each data line 210 is provided with a different compensation circuit 110 according to the impedance curve distribution of the fan-out traces 220, and each compensation circuit 110 has a different compensation level. After the initial compensation level of each compensation circuit 110 is set according to the impedance curve of the fan-out traces 220, the compensation levels are adjusted up or down depending on different gray scales or different scanning times to realize fine-tuning of the display panel 200 and improve the display effect of the display panel 200.

Figure 3:
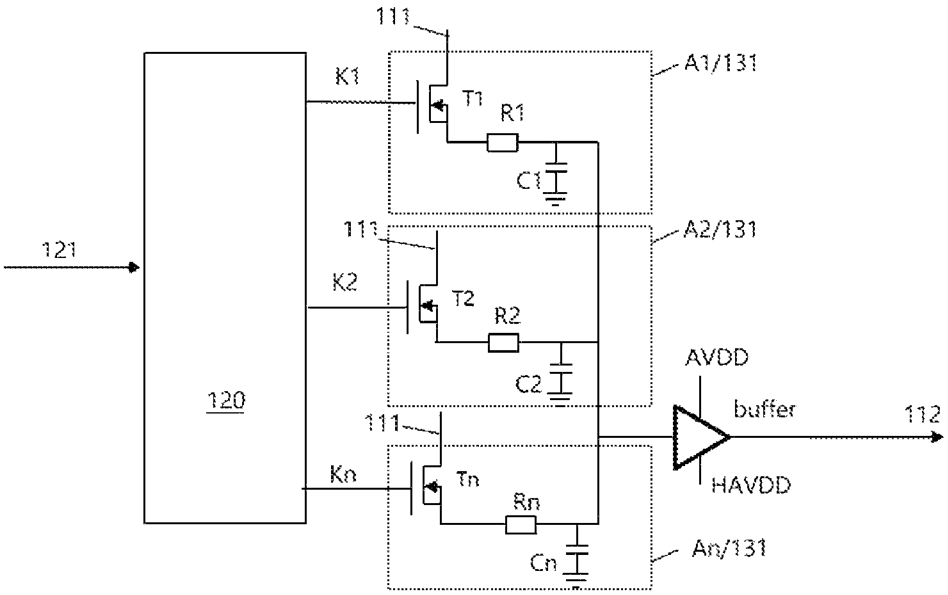
FIG. 3 is a schematic diagram of a compensation circuit according to a first embodiment of the present application.

FIG. 3 is a schematic diagram of a compensation circuit 110 of a first embodiment of the present application. Referring to FIG. 3, the compensation circuit 110 includes a compensation level selection circuit 120 and a gating circuit 130. The gating circuit 130 includes a plurality of channels 131. The resistance values or capacitance values of the plurality of channels 131 increase sequentially. A control terminal of each channel 131 is connected to the compensation level selection circuit 120. The compensation level selection circuit 120 controls the conduction of the plurality of channels 131, and only one channel 131 is conducting at a time.

In particular, the compensation level selection circuit 120 includes a control input terminal 121 and a number of n control output terminals K1/K2 . . . /Kn. The compensation level selection circuit 120 is a DAC digital-to-analog converter. The control input terminal 121 receives a control signal. The control signal is a digital signal, which can control which control output terminal of the DAC digital-to-analog converter outputs, and further controls which channel 131 of the gating circuit 130 is turned on.

Each channel 131 is connected to the enhanced driving module Buffer, and the enhanced driving module Buffer is used to enhance the driving capability of the data signal, and the data signal is output to the respective fan-out trace 220 after passing through the enhanced driving module Buffer.

In particular, the gating circuit 130 includes a number of n channels 131, where n is a positive integer greater than or equal to 2. The first channel A1 includes a first active switch T1, a first resistor R1 and a first capacitor C1. The n-th channel An includes an n-th active switch Tn, an n-th resistor Rn and an n-th capacitor Cn. One end of each of the n channels 131 is connected to the respective input terminal of the compensation circuit 110. The other end of each of the n channels 131 is connected to the respective output terminal of the compensation circuit 110. The first active switch T1 is connected in series with the first resistor R1. One end of the first capacitor C1 is connected to one end of the first resistor R1, and the other end of the first capacitor C1 is grounded. The n-th active switch Tn is connected in series with the n-th resistor Rn. One end of the n-th capacitor Cn is connected to one end of the n-th resistor Rn, and the other end of the n-th capacitor Cn is grounded. The n control output terminals are respectively connected to the control terminals of the first active switch T1, . . . , and the n-th active switch Tn.

Each channel 131 is provided with an active switch, and a matching circuit including a capacitor and a resistor. The matching circuit of the capacitor and the resistor is mainly used to assist in configuring the corresponding fan-out trace 220, and may be connected in series or in parallel with the fan-out trace 220.

In this embodiment, compared with the solution of compensating the mura problem caused by the fan-out traces 220 by completely using software setting or a preset compensation table, this application directly sets the equivalent resistance and equivalent capacitance in the data driving circuit 100, that is, the compensation circuit 110. Thus, it is more accurate through direct compensation of the equivalent resistance and equivalent capacitance. Moreover, it is not necessary to take pictures of the display screen of the display panel 200 through a pixel-level camera during the test to test the mura existing therein, and to deploy a preset compensation table according to the mura phenomenon of the picture, where its precision depends entirely on the camera's ability to take pictures. In this application, however, the optimal display compensation may be found through compensation level-by-compensation level adjustment during the testing process.

Figure 4:
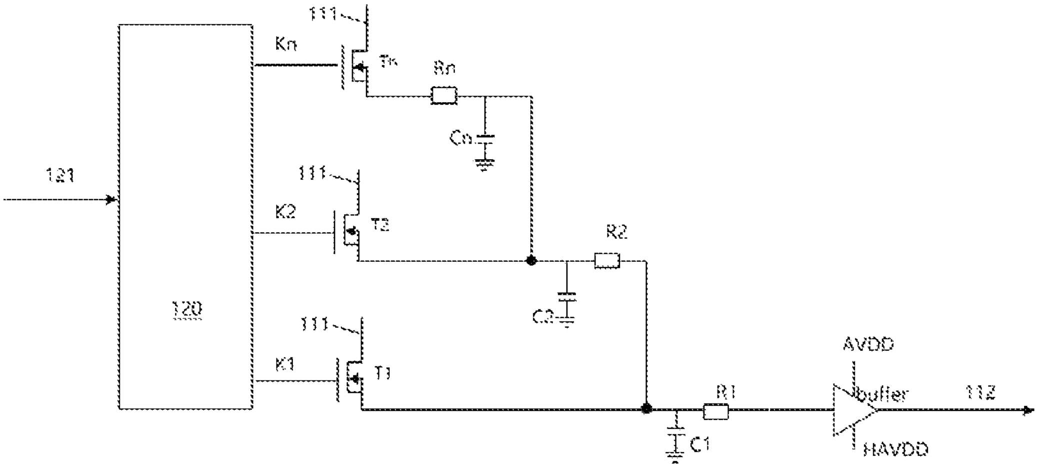
FIG. 4 is a schematic diagram of a compensation circuit according to a second embodiment of the present application.

FIG. 4 is a schematic diagram of a compensation circuit 110 of a second embodiment of the present application. Referring to FIG. 4, the compensation circuit 110 includes a compensation level selection circuit 120 and a gating circuit 130. The gating circuit 130 includes a plurality of channels 131. The resistance values or capacitance values of the plurality of channels 131 increase sequentially. A control terminal of each channel 131 is connected to the compensation level selection circuit 120. The compensation level selection circuit 120 controls the conduction of multiple channels 131, and only one channel 131 is conducting at a time. The compensation level selection circuit 120 includes a control input terminal 121 and a number of n control output terminals.

The gating circuit 130 includes n channels 131, where n is a positive integer greater than or equal to 3. The first channel A1 includes a first active switch T1, a first resistor R1 and a first capacitor C1. The second channel A2 includes a second active switch T2, a second resistor R2 and a second capacitor C2. The n-th channel An includes an n-th active switch Tn, an n-th resistor Rn and an n-th capacitor Cn. The n control output terminals are respectively connected to the control terminals of the first active switch T1, . . . , the n-th active switch Tn. The first active switch T1 is connected in series with the first resistor R1. One end of the first capacitor C1 is connected to one end of the first resistor R1, and the other end of the first capacitor C1 is grounded. The other end of the first resistor R1 is connected to an output terminal of the compensation circuit 110. The input terminal of the first active switch T1 is connected to the input terminal of the compensation circuit 110. The second active switch T2 is connected in series with the second resistor R2. One end of the second capacitor C2 is connected to one end of the second resistor R2, and the other end of the second capacitor C2 is grounded. The other end of the second resistor R2 is also connected between the first resistor R1 and the first active switch T1. The input terminal of the second active switch T2 is connected to the input terminal of the compensation circuit 110. The n-th active switch Tn is connected in series with the n-th resistor Rn. One end of the n-th capacitor Cn is connected to one end of the n-th resistor Rn, and the other end of the n-th capacitor Cn is grounded. The other end of the n-th resistor Rn is also connected between the (n−1)th resistor and the (n−1)th active switch. The input terminal of the n-th active switch Tn is connected to the input terminal of the compensation circuit 110.

Compared with the previous embodiment, this embodiment is different in that each channel 131 shares the design of the equivalent resistance and equivalent capacitance of the previous channel 131. Referring to FIG. 4, only one end of the first resistor in the first channel A1 is connected to the output terminal of the compensation circuit 110, while the other channels 131 all use the first resistor for output. For example, in the third channel 131, the first resistor, the second resistor and the third resistor are connected in series and then output, and in the second channel A2, the first resistor and the second resistor are connected in series and then output. The circuit design of this embodiment makes the circuit more streamlined. On the one hand, it can reduce the number of resistors, and on the other hand, it can improve the utilization rate of the circuit.

In particular, the resistance values of the first resistor, the second resistor, . . . , the n-th resistor are equal. The capacitance values of the first capacitor, the second capacitor, . . . , the n-th capacitor are equal. In this embodiment, resistors with the same resistance or capacitors with the same capacitance may be set. From the first channel A1 to the n-th channel An, as the level of channel 131 increases, each channel 131 is incremented with the same resistance and capacitance compared to the previous channel 131. That is, as the number of stages increases, the equivalent resistance or equivalent capacitance of the channel 131 increases with the stages, forming an arithmetic progression. In this embodiment, the resistance value of each resistor is the minimum difference for adjusting each compensation level. When the resistance value is smaller, that is, the difference between different compensation levels is smaller, the compensation level precision is higher. When the resistance value is larger, the difference between different compensation levels is larger, and the compensation level adjustment range is larger.

It may be understood that, in this embodiment, the solution of combining the first resistor, the second resistor, . . . , the n-th resistor and the capacitor may be replaced by the solution of only setting the capacitors, or may be replaced by the solution of only setting the resistors, which may be selected according to actual conditions.

In this embodiment, the compensation circuit 110 is disposed on a chip on film (COF) or a printed circuit board (PCB). In the circuit design, it may be set in the data driver, and it can also be set on the panel, but it is difficult to realize the narrow-bezel display for the solution where it is designed on the panel. The arrangement in the data driver does not affect the narrow-bezel, and adding the compensation circuit 110 in the data driver is easier to process and implement, and the cost is relatively lower.

It may be understood that the compensation circuits 110 of the above two embodiments may be used in combination.

In particular, the number of the compensation circuits 110 is less than or equal to the number of the fan-out traces 220. When the number of the compensation circuits 110 is less than the number of the fan-out traces 220, at least two adjacent fan-out traces 220 share one compensation circuit 110.

As the resolution of the display panel 200 increases, the number of its data lines 210 is also greatly increased. For example, a display panel 200 with a resolution of 1920*1080 has 1920 data lines 210. If a compensation circuit 110 is provided for each data line 210, a high cost circuit design may be required, and the circuit complexity is also high. Therefore, in an embodiment, the number of compensation circuits 110 may be selected to be smaller than the number of fan-out traces 220, and the fan-out traces 220 corresponding to adjacent data lines 210 share one compensation circuit 110. When the compensation is shared, multiple compensation circuits 110 may be controlled by one compensation level selection circuit 120, or the same compensation circuit 110 may be connected to multiple fan-out traces 220, where the connection methods include parallel connection or series connection. Parallel connection means that multiple fan-out traces 220 select the same compensation level for compensation. The method of series connection is relatively complicated, and the compensation circuit 110 of the above two embodiments needs to be used in combination. For example, after the first channel A1 of the compensation circuit 110 of the first embodiment, the compensation circuit 110 of the second embodiment may be added, which is essentially the multiplexing of the compensation circuit 110 of the second embodiment. Taking FIG. 4 as an example, three channels 131 are provided, with three channels 131 as a group, multiple groups are provided in one compensation circuit 110, and each group of channels 131 is connected to a plurality of fan-out traces 220, thereby realizing multiplexing. Of course, in this embodiment, the number of the compensation circuits 110 may be equal to the number of the data lines 210, so as to achieve more precise adjustment.

Figure 5:
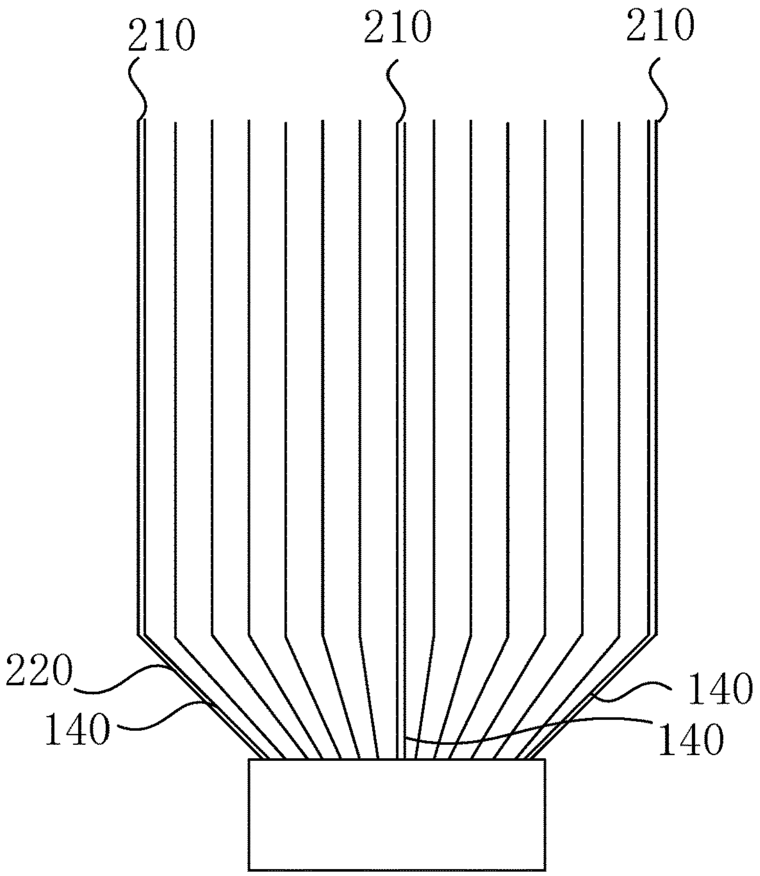
FIG. 5 is a schematic diagram of a feedback circuit according to the present application.

FIG. 5 is a schematic diagram of a feedback circuit of the present application. Referring to FIG. 5, the driving circuit 100 further includes a feedback circuit. The feedback circuit includes a comparator and at least two feedback signal lines 140. At least one of the feedback signal lines 140 is connected to the shortest fan-out trace 220. At least one of the feedback signal lines 140 is connected to the longest fan-out trace 220. The comparator is used to separately receive the feedback signal on each feedback signal line 140 and the data signal of the fan-out trace 220 connected to the feedback signal, and output a comparison result after comparison. The compensation circuit 110 selects the compensation level of the compensation circuit 110 according to the comparison result. It may be understood that the feedback signal line may be set only in the fan-out trace region, or may be extended to the data line. In order to detect the uneven impedance of the fan-out trace region, it may be installed in the fan-out trace. If it is to reduce the total length of the data line and the fan-out trace, it may be extended to the data line.

In this embodiment, a feedback circuit is also designed. During the test, after the initial data is input, the data driver outputs the initial data signal, and then the data driver receives the feedback signal, calculates the difference between the feedback signal of the shortest fan-out trace 220 and the initial data signal, and the difference between the feedback signal of the longest fan-out trace 220 and the initial data signal, and accordingly initially adjusts the initial compensation level of each compensation circuit 110 according to the two differences.

After the test is completed, when the preset initial compensation level is entered and the power is turned on, the data driver outputs the target data signal to compensate with the preset initial compensation level. The data driver receives the feedback signal again, and the comparator compares the difference between the target data signal and the feedback signal, and again controls the compensation level selector to gear up or down the compensation circuit 110 on a compensation level-by-compensation level basis.

Secondly, according to the change of the difference between the longest fan-out trace 220 and the shortest fan-out trace 220, it may be regarded as linear. For example, from left to right, between the longest fan-out trace 220 and the shortest fan-out trace 220, the impedance decreases. From left to right, between the shortest fan-out trace 220 and the longest fan-out trace 220, the impedance increases. Therefore, in this embodiment, only by calculating the impedance difference between the two terminals, it may be used to detect the difference of the feedback signal, and realize the compensation level selection of the compensation circuit 110 more accurately.

Figure 6:
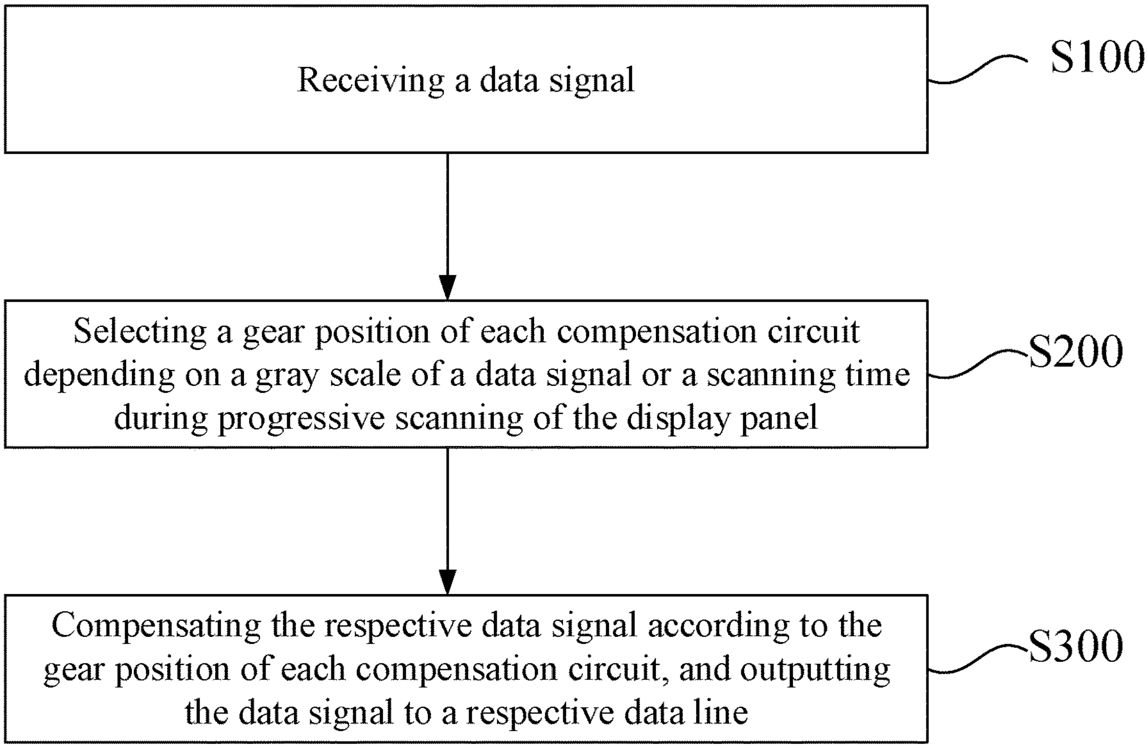
FIG. 6 is a flowchart of a driving method of a driving circuit according to the present application.

FIG. 6 is a flowchart of a driving method of a driving circuit of the present application. Referring to FIG. 6, the present application discloses a driving method of a driving circuit. The driving circuit includes the above-mentioned driving circuit of the display panel. The driving method includes:

S100: receiving a data signal;

S200: selecting a compensation level of the compensation circuit according to a gray scale of the data signal or a scanning time during the progressive scanning of the display panel;

S300: compensating the data signal according to the compensation level of the compensation circuit and outputting the data signal to a corresponding data line.

The compensation circuit in this application has different compensation level selections, and its resistance and capacitance are different in different gear compensation levels. In different gray scales or scanning times, different compensation levels may be selected to match the fan-out traces. First, in different panel designs, the design of the fan-out traces is also different. The compensation circuit of the present application can have various resistance values or capacitance values to balance the impedance differences of the fan-out traces. Therefore, in the face of different designs of the fan-out traces, the present application can balance the impedance differences of the fan-out traces only by modifying different compensation levels. Second, due to the wiring design of the data lines, on the same data line, the pixel charging path relatively close to the data driver is relatively short and has relatively low impedance, while the pixel charging path far away from the data driver is relatively long and has relatively high impedance. Therefore, the present application gradually increases or decreases the compensation level to realize that the pixel far away from the data driver and with a high charging impedance is configured with a compensation circuit with a lower resistance value or capacitance value, so as to balance the charging differences caused by the charging paths on the same data line. Third, since the voltage values of the data signals corresponding to different gray scales are different, on the same data line, the display unevenness caused by different voltage values is not linearly correlated. Therefore, for the same data line, different gray scales require different resistance values of the compensation circuit. For this application, by adjusting compensation levels, the compensations under different gray scales can also be realized, thereby making the display under different gray scales more uniform. The solution of setting the compensation circuit in this application is relatively lower in cost, and for different pixels and different gray scales of the same data line and for the multiple data lines, the uneven impedance can all be compensated, so that the display effect of the display panel is better.

Moreover, the feedback signal in this embodiment may be used for automatic compensation level adjustment, in particular including the following.

The following steps are further includes before S100:

S001: after receiving the initial data signal, outputting the initial data signal to the corresponding data line;

S002: receiving feedback signals on at least two feedback signal lines, and outputting a comparison result after comparing them against the data signals on the data lines connected to the feedback signals;

S003: setting the initial compensation levels of the plurality of compensation circuits according to the comparison result;

where the step of S200 includes:

S201: choosing to raise or lower the initial compensation level according to the gray scale of the data signal or the scanning time during the progressive scanning of the display panel.

In this embodiment, in addition to including the design of the initial compensation level, the compensation level may be selected according to the gray scales of different data signals and the times of different rows in the scanning period. The specific circuit is also provided with the above-mentioned feedback circuit, and according to the feedback signal, the compensation level is selected at the gray scales of different data signals and the times of different rows in the scanning period.

For example, in the initial compensation level, the data signals on the same data line change from low gray scale to high gray scale, then compensation level selection is performed according to the difference information of the two feedback signals.

For example, in the initial compensation level, when the data signal on the same data line is scanned progressively from the previous row to n-th row, the compensation level is selected according to the difference information of the two feedback signals of the data signal when the current line and n-th line are scanned.

Regarding the feedback times of the feedback signal, considering the power consumption, it is generally adjusted in the test in this application. During normal display, the feedback signal may be fed back multiple times within one frame.

It should be noted that the inventive concept of the present application may be formed into many embodiments, but the length of the application document is limited and so these embodiments cannot be enumerated one by one. The technical features may be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A driving circuit for a display panel, the display panel comprising a plurality of data lines and a plurality of fan-out traces, wherein the plurality of data lines are connected to the plurality of fan-out traces in one-to-one correspondence, wherein the driving circuit comprises:

a plurality of compensation circuits, each of the plurality of compensation circuits comprises a plurality of input terminals and a plurality of output terminals, wherein the plurality of output terminals of the plurality of compensation circuits are respectively connected to the plurality of fan-out traces; wherein at least two compensation levels are set in each of the plurality of compensation circuits, wherein when a compensation level of a compensation circuit increases, a capacitance value or resistance value of the compensation circuit decreases gradually; and a signal input unit, configured to output data signals to the plurality of input terminals of the plurality of compensation circuits;

wherein each of the plurality of compensation circuits is operative to select a compensation level depending on a gray scale of a data signal or a scanning time during progressive scanning of the display panel; wherein each of the plurality of compensation circuits comprises a compensation level selection circuit and a gating circuit; wherein the gating circuit comprises a plurality of channels, wherein the resistance values or capacitance values of the plurality of channels increase sequentially, wherein a control terminal of each of the plurality of channels is connected to the compensation level selection circuit, and wherein the compensation level selection circuit is configured to control a conduction of the plurality of channels, and wherein only one of the plurality of channels is conducting at a time;

wherein the compensation level selection circuit comprises a control input terminal and a number of n control output terminals; wherein the gating circuit comprises a number of n channels, n being a positive integer greater than or equal to 2, wherein a first channel includes a first active switch, a first resistor, and a first capacitor; and wherein an n-th channel comprises an n-th active switch, an n-th resistor and an n-th capacitor; wherein one end of each of the n channels is coupled to the input terminal of a respective compensation circuit, and wherein another end of each of the n channels is coupled to the output terminal of the respective compensation circuit; wherein the first active switch is connected in series with the first resistor, wherein one end of the first capacitor is connected to one end of the first resistor, and another end of the first capacitor is grounded; wherein the n-th active switch is connected in series with the n-th resistor, wherein one end of the n-th capacitor is connected to one end of the n-th resistor, and another end of the n-th capacitor is grounded; wherein the n control output terminals are respectively connected to the control terminals of the first active switch to the n-th active switch.

2. The driving circuit as recited in claim 1, wherein on a same data line, when the gray scale of the data signal gradually decreases, the compensation level of a respective compensation circuit gradually increases.

3. The driving circuit as recited in claim 1, wherein a number of the plurality of compensation circuits is less than or equal to a number of the plurality of fan-out traces;

wherein when the number of the plurality of compensation circuits is less than the number of the plurality of fan-out traces, at least two adjacent fan-out traces share one compensation circuit.

4. The driving circuit as recited in claim 1, wherein the resistance values of the first resistor to the n-th resistor increase sequentially; and wherein the capacitance values of the first capacitor to the n-th capacitor increase sequentially.

5. The driving circuit as recited in claim 1, further comprising a feedback circuit, the feedback circuit comprising a comparator and at least two feedback signal lines, wherein at least one feedback signal line is connected to a shortest fan-out trace, and at least one feedback signal line is connected to a longest fan-out trace;

wherein the comparator is configured to: receive a feedback signal on each of the at least two feedback signal lines and a data signal of the respective fan-out trace connected to the feedback signal; compare the feedback signal against the data signal of the respective fan-out trace connected to the feedback signal; and output a comparison result after the comparison; wherein each compensation circuit is configured to select a compensation level of the compensation circuit depending on the comparison result.

6. The driving circuit as recited in claim 1, wherein within a scanning time of one frame of the display panel, the compensation levels of the plurality of compensation circuits on a same data line gradually increase in a progressive scanning direction across the plurality of scanning lines.

7. The driving circuit as recited in claim 1, wherein a number of compensation levels of the respective compensation circuit configured with a data line connected to a relatively shorter fan-out trace is greater than a number of compensation levels of a respective compensation circuit configured with a data line connected to a relatively longer fan-out trace.

8. The driving circuit as recited in claim 1, wherein the signal input unit comprises a timing controller.

9. A driving method of a driving circuit, the driving circuit comprising a plurality of compensation circuits and a signal input unit; wherein each of the plurality of compensation circuits comprises an input terminal and an output terminal; wherein a plurality of the output terminals of the plurality of compensation circuits are respectively connected to a plurality of fan-out traces; wherein at least two compensation levels are set in each of the plurality of compensation circuits, wherein when a compensation level of a compensation circuit increases, a capacitance or resistance value of the compensation circuit gradually decreases;

wherein the signal input unit is configured to output data signals to a plurality of input terminals of the plurality of the compensation circuits;

wherein the driving method comprises:

after receiving an initial data signal, outputting the initial data signal to a respective data line;

receiving a feedback signal on each of at least two feedback signal lines, comparing the feedback signal against the initial data signal on the respective data line connected to the feedback signal, and outputting a comparison result after comparison;

setting an initial compensation level of each of the plurality of compensation circuits according to the comparison result;

receiving a data signal;

selecting a compensation level of each of the plurality of compensation circuits depending on a gray scale of the data signal or a scanning time during progressive scanning of the display panel;

compensating a respective data signal according to the compensation level of each of the plurality of compensation circuits, and outputting the respective data signal to a respective data line;

wherein the operation of selecting the compensation level of each compensation circuit depending on the gray scale of the data signal or the scanning time during the progressive scanning of the display panel comprises:

choosing to increase or decrease the initial compensation level depending on the gray scale of the data signal or the scanning time during the progressive scanning of the display panel.

10. The driving method as recited in claim 9, wherein when the grayscale of the data signal gradually decreases on a same data line, the compensation level of a respective compensation circuit gradually increases.

11. The driving method as recited in claim 9, wherein within a scanning time of one frame of the display panel, the compensation levels of the compensation circuits on a same data line gradually increase in a progressive scanning direction across the plurality of scanning lines.

12. A driving circuit for a display panel, the display panel comprising a plurality of data lines and a plurality of fan-out traces, wherein the plurality of data lines are connected to the plurality of fan-out traces in one-to-one correspondence, wherein the driving circuit comprises:

a plurality of compensation circuits, each of which comprising an input terminal and an output terminal, wherein the plurality of output terminals of the plurality of compensation circuits are respectively connected to the plurality of fan-out traces; wherein at least two compensation levels are set in each compensation circuit, wherein when a compensation level of the compensation circuit increases, a capacitance value or resistance value of the compensation circuit decreases gradually; and a signal input unit, configured to output data signals to the plurality of input terminals of the plurality of compensation circuits;

wherein each compensation circuit is operative to select a compensation level depending on a gray scale of a data signal or a scanning time during progressive scanning of the display panel; wherein each compensation circuit comprises a compensation level position selection circuit and a gating circuit; wherein the gating circuit comprises a plurality of channels, wherein the resistance values or capacitance values of the plurality of channels increase sequentially, wherein a control terminal of each channel is connected to the compensation level position selection circuit, and wherein the compensation level position selection circuit is configured to control a conduction of the plurality of channels, and wherein only one of the plurality of channels is conducting at a time;

wherein the compensation level position selection circuit comprises a control input terminal and a number of n control output terminals; wherein the gating circuit comprises a number of n channels, n being a positive integer greater than or equal to 3, wherein a first channel comprises a first active switch, a first resistor and a first capacitor; wherein the second channel comprises a second active switch, a second resistor, and a second capacitor; and wherein the n-th channel comprises an n-th active switch, an n-th resistor, and an n-th capacitor; wherein the n control output terminals are respectively connected to the control terminals of the first active switch to the n-th active switch;

wherein the first active switch is connected in series with the first resistor, wherein one end of the first capacitor is connected to one end of the first resistor, and another end of the first capacitor is grounded, and wherein the one end of the first resistor is further coupled to the output terminal of the respective compensation circuit, and wherein an input terminal of the first active switch is connected to the input terminal of the respective compensation circuit;

wherein the second active switch is connected in series with the second resistor, wherein one end of the second capacitor is connected to one end of the second resistor, and another end of the second capacitor is grounded, and wherein another end of the second resistor is connected between the first resistor and the first active switch, and an input terminal of the second active switch is connected to the input terminal of the respective compensation circuit;

wherein the n-th active switch is connected in series with the n-th resistor, wherein one end of the n-th capacitor is connected to one end of the n-th resistor, and another end of the n-th capacitor is grounded, and wherein the one end of the n-th resistor is also connected between the $(n-1)$th resistor and the $(n-1)$th active switch, and wherein an input terminal of the n-th active switch is connected to the input terminal of the respective compensation circuit.

13. The driving circuit as recited in claim 12, wherein the first resistor to the n-th resistor have an equal resistance value; and wherein the first capacitor to the n-th capacitor have an equal capacitance value.

* * * * *